United States Patent [19]

Bjork

[11] Patent Number: 5,384,534
[45] Date of Patent: Jan. 24, 1995

[54] SELF-POWERED ELECTRO-OPTIC ROTATIONAL POSITION SENSOR WITH MAGNETIC PICKUP

[75] Inventor: Paul E. Bjork, Forest Lake, Minn.

[73] Assignee: Honeywell Inc., Minneapolis, Minn.

[21] Appl. No.: 964,228

[22] Filed: Oct. 21, 1992

[51] Int. Cl.6 .................. G01P 3/44; G01P 3/487; G01P 3/488; H04B 10/08
[52] U.S. Cl. .................................. 324/160; 324/96; 324/162; 324/166; 324/174; 324/175; 324/207.15; 324/207.25; 359/154; 359/184; 307/650
[58] Field of Search ................. 324/96, 160, 162, 163, 324/166, 173, 174, 175, 207.15, 207.16, 207.25, 207.21; 328/5; 359/184–186

[56] References Cited

U.S. PATENT DOCUMENTS

| | | | |
|---|---|---|---|
| 3,467,858 | 9/1969 | Burnett | 324/96 X |
| 3,729,989 | 5/1973 | Little | 324/166 X |
| 4,127,812 | 11/1978 | Baliguet | 324/174 |
| 4,204,115 | 5/1980 | Boldridge, Jr. | 324/175 X |
| 4,224,570 | 9/1980 | Meserow | 324/175 |
| 4,536,708 | 8/1985 | Schneider | 324/174 |
| 4,599,561 | 7/1986 | Takahashi et al. | 324/207.21 X |
| 4,731,898 | 3/1988 | Sovis et al. | |
| 4,866,987 | 9/1989 | Willson et al. | 324/175 X |
| 4,928,067 | 5/1990 | Lind | 324/96 |
| 5,109,191 | 4/1992 | Nakamura | 324/166 X |

Primary Examiner—Gerard R. Strecker
Attorney, Agent, or Firm—John G. Shudy, Jr.

[57] ABSTRACT

An indicating system for measuring movement of a material, having a magnetic pickup device, waveform conditioning circuit and light signal emitter functioning under the system's own self-made power, having a light waveguide or optic fiber connecting the light signal emitter to a light signal receiver which in turn is connected to a signal processor for outputting information such as speed, acceleration and/or position of the material.

5 Claims, 4 Drawing Sheets

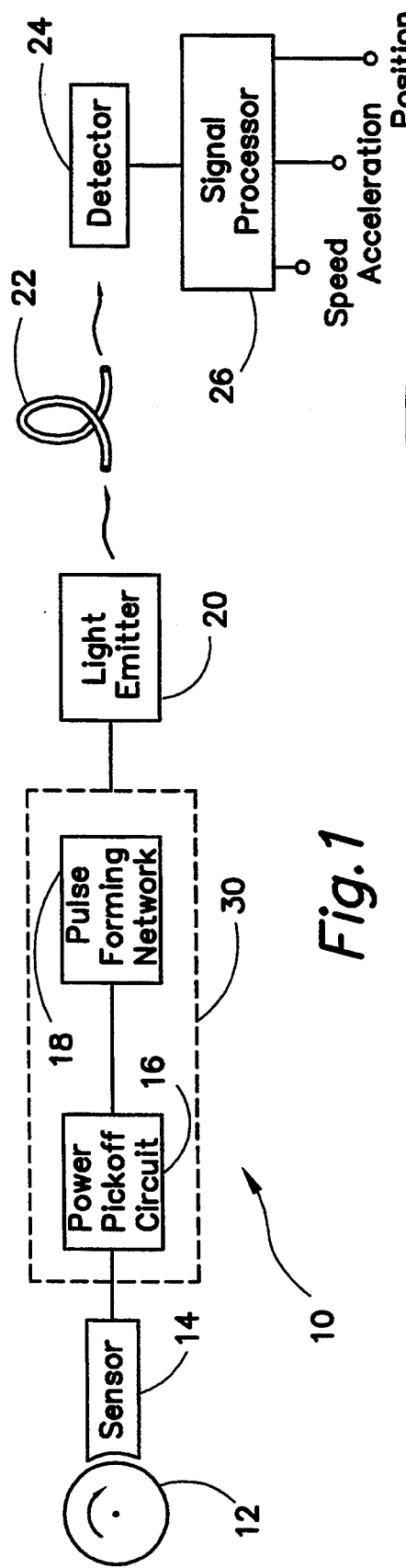
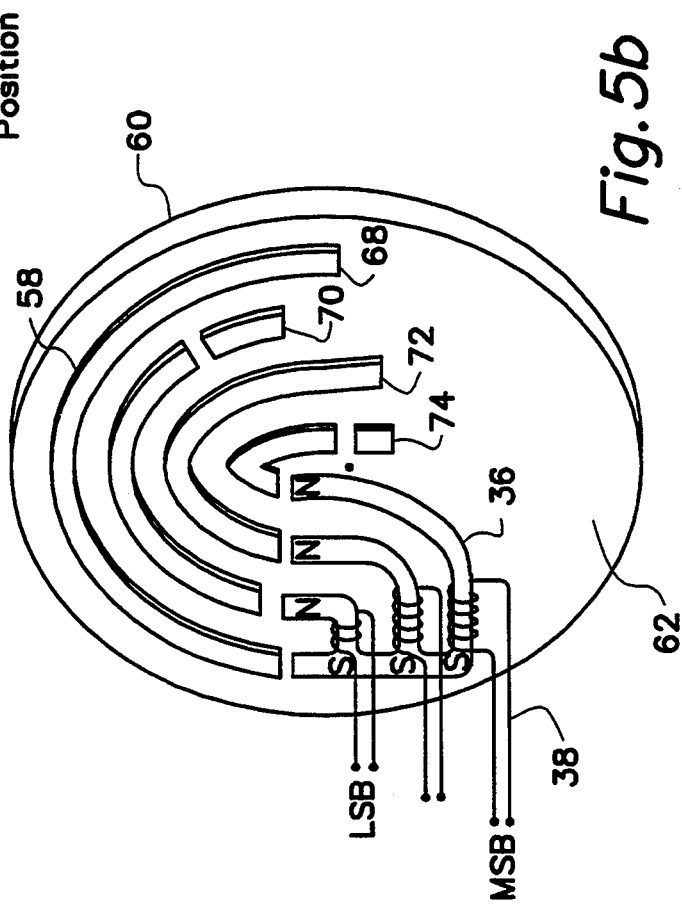
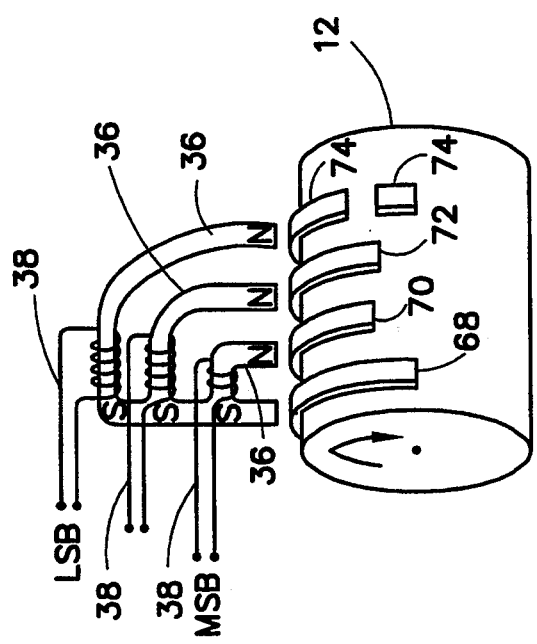

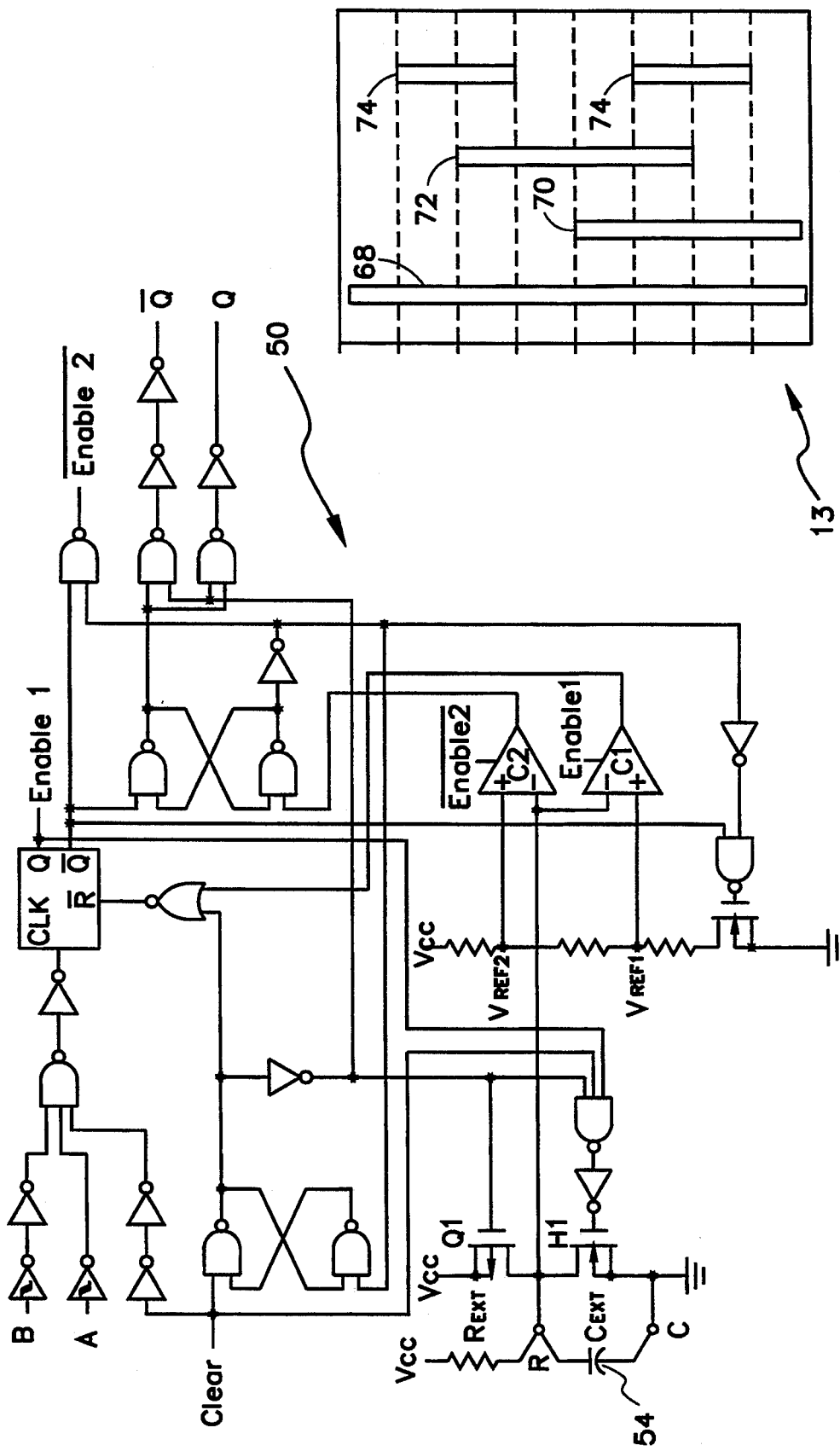

SELF-POWERED ELECTRO-OPTIC ROTATIONAL POSITION SENSOR WITH MAGNETIC PICKUP

BACKGROUND OF THE INVENTION

The invention relates to an apparatus for obtaining information on the motion of a moving element, preferably for determining the speed and position of a rotating element. Various kinds of apparatus for obtaining speed information are known. In a conventional arrangement for measuring revolutions per minute (rpm) of a rotating gear, a sensor near the teeth of the gear detects magnetic irregularities and transmits these irregularities as electrical signals to an evaluation circuit that determines the rpm of the gear from the electrical signals. However, such kinds of apparatus are affected by external electrical signals or noise which is picked up during the transmission of electrical signals from the sensor to the evaluation circuit. But such apparatus may transmit speed information with light signals in lieu of electrical signals from the sensor to the evaluation circuit to reduce electromagnetic interference. The apparatus may even have a self-powered sensor which detects the magnetic irregularities and transmits signals via light signals. The disadvantages of this apparatus is that the light signal generation and information conveyance capacity are notably inefficient.

SUMMARY OF THE INVENTION

The present invention has a sensor that generates electrical signals due to a changing magnetic flux caused by the device measured. Power is picked off from the electrical signals to operate a circuit that processes the generated signals into efficient and effectively shaped pulses which in turn are converted into light pulses to be sent via a light waveguide or optical fiber to a light-to-electrical signal converter which is connected to a processor for processing the received converted light-to-electrical signals into usable information such as speed, acceleration and position. Applications of this invention may include, for instance, camshaft or antilock braking devices.

BRIEF DESCRIPTION OF THE DRAWINGS

FIG. 1 is a basic functional diagram of the invention.

FIG. 4 is a flat view of a surface having bars that may encircle an axle or drum, for activating the reluctance sensor.

FIGS. 5a and 5b illustrate several pickup device configurations capable of providing position information.

FIG. 6 is a schematic of the multivibrator incorporated in the sensor and transmitter system.

DESCRIPTION OF THE PREFERRED EMBODIMENTS

Figure 2:
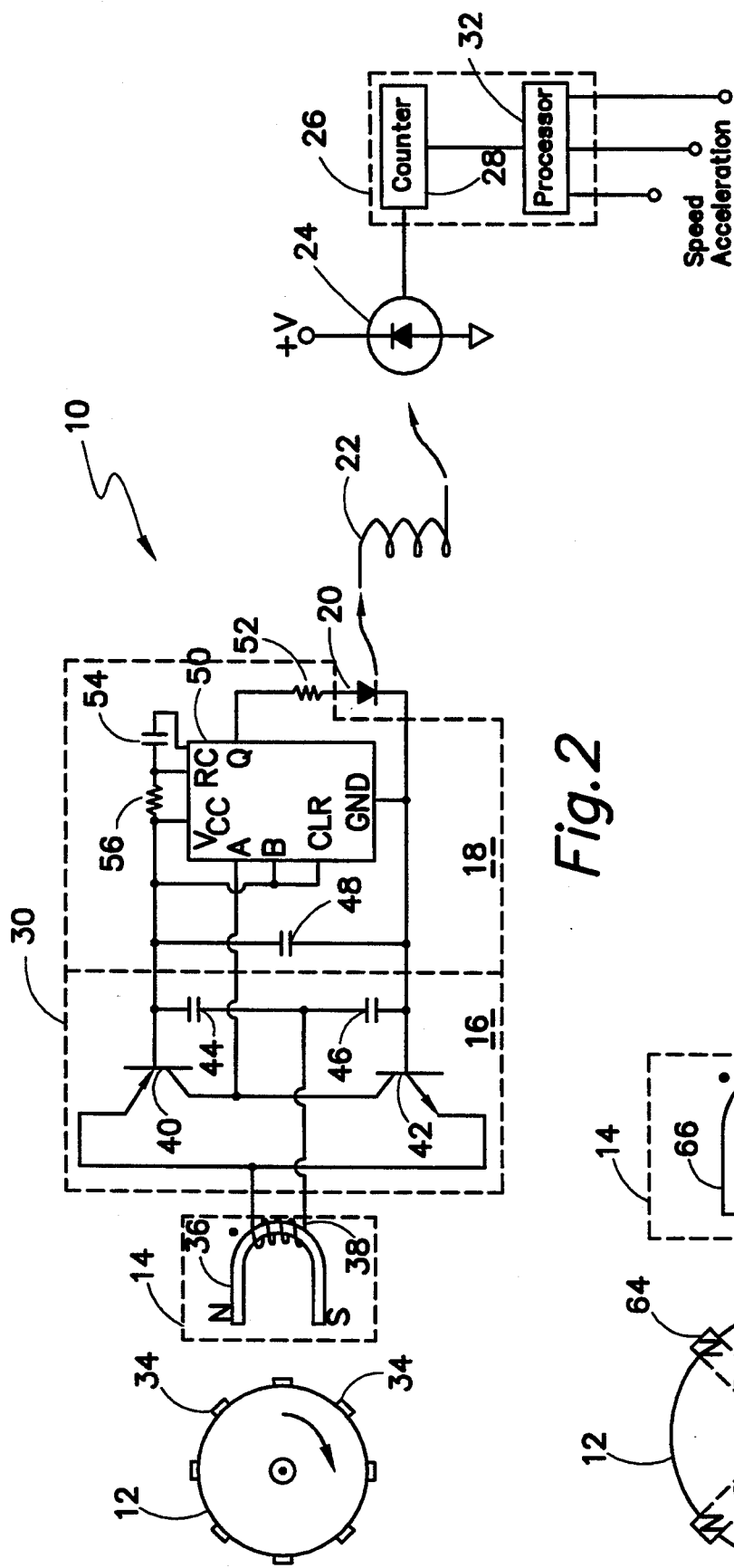
FIG. 2 is a schematic of an embodiment of the self-powered variable reluctance sensor and optical transmitter system.

FIG. 1 is a diagram of self-powered variable reluctance sensor and optical transmitter system 10. System 10 can measure speed, acceleration and/or position of device 12. Device 12 may be a rotating gear or shaft in many applications of the present invention. Sensor 14 is a magnetic pickup which senses variations of magnetic flux due to the passing or movement of ferrous or ferric material near sensor 14. Such variation of magnetic flux may be interpreted to be an indication of speed, acceleration or position of device 12 to be measured. The output of sensor 14 is an electrical signal caused by the variation of the magnetic flux causing an inducement of electromagnetic force or voltage in a winding and resulting in an electrical signal from sensor 14. The signal from sensor 14 is sent to power pickoff circuit 16 which extracts some of the electrical power from the sensor 14 signal. The extracted power is utilized to operate pulse-forming network 18 and light emitter 20. The sensor signal goes from circuit 16 to pulse-forming network 18. Pulse-forming network 18 shortens and makes more definitive the electric signal from sensor 14. The sensor signal goes from pulse-forming network 18 to light emitter 20. Light emitter 20 converts the electric sensor signal into a light signal which is a representative counterpart of the electric sensor signal. The light signal is conveyed through light waveguide 22 or optic fiber 22 onto photo detector 24. Detector 24 converts the light signal into an electrical signal. The electrical signal goes to signal processor 26. Signal processor 26 analyzes the signal from detector 24 and extracts information such as speed, acceleration and position of device 12.

FIG. 2 shows system 10 in more detail than FIG. 1. Device 12 may be a shaft or a gear with very shallow cogs or teeth 34. Sensor 14 has a magnetic pole piece 36 along with coil 38. Gear wheel 12 turns and teeth 34 periodically close the magnetic circuit of pole piece 36. A change of magnetic flux cutting through coil 38 generates an electromotive force which is equal to $-d\phi/dt$. The expression 37 $d\phi$" is a measure of instantaneous magnetic flux and "dt" is an increment of time. In other words, $d\phi/dt$ indicates the time rate of change of the magnetic flux and therefore the angular speed of gear 12. The gap dimensions between cogs or teeth 34 and pole device 36 may be between 1 and 10 mils. The teeth may be arranged in a pattern that is etched or cast into a face of a gear or wheel with pole piece 36 positioned appropriately close to the pattern. An electrical signal from winding 38 goes to circuit 30 which incorporates a power pickoff circuit 16 and pulse-forming network 18. One side of coil 38 is connected to the emitters of transistors 40 and 42. Transistor 40 is a PNP transistor which may be a 2N2907. Transistor 42 is an NPN transistor and may be a 2N2222. The collectors of transistors 40 and 42 are connected together. The other lead of winding 38 is connected to the bases of transistors 40 and 42 via capacitors 44 and 46, respectively. Each of the capacitors 44 and 46 has a value of 1 microfarad. The bases of transistors 40 and 42 are connected together by capacitor 48 which has a value of about 10 microfarads. Pulse forming network 18 includes a chip 50 which is a CMOS integrated circuit 74HC123. Such circuit is made by National Semiconductor, Inc. The connections are standard for a one-shot multivibrator. The base of transistor 40 is connected to terminal $V_{cc}$ on integrated circuit 50. Also, the connection from the base of transistor 40 is connected to terminal B and the "clear" terminal of integrated circuit 50. The base of transistor 42 is connected to the ground terminal of integrated circuit 50. The base of transistor 40 is also connected to one end of resistor 56 which has a value of 56,000 ohms. The other end of resistor 56 is connected to the R terminal of integrated circuit 50 and connected to one end of capacitor 54. Capacitor 54 has its other end connected to the C terminal of integrated circuit 50. The value of capacitor 54 is 22 picofarads. The collectors of transistors 40 and 42 are connected to the A terminal of integrated circuit 50. Resistor 52 has one end connected to the Q output of integrated circuit 50. The other end of resistor 52 is connected to a light emitting diode (LED) 20. Resistor 52 has a value of 100 ohms. The other end of light emitting diode 20 is connected to the ground connection of integrated circuit 50. Light emitting diode 20 may be a Honeywell HFE 4000 LED. The output of LED 20 goes to optical fiber 22. Optical fiber 22 is coupled to LED 20 with an SMA connector. Fiber 20 is multimode fiber having a core diameter dimension of 100 microns and cladding diameter of 140 microns. The signal from LED 20 goes through fiber 22 onto a photo detector 24 which is usually situated at another location remote from circuit 30. Photo diode 24 may be a Honeywell HFD 3000 integrated photo diode receiver with a transistor-transitor logic (TTL) output. Diode 24 is mounted in an SMA connector. Fiber 22 may be of a length as needed and can be in meters or kilometers. Photo diode 24 is connected to receiver electronics 26. Receiver electronics 26 includes counter 28 which is connected to photo diode 24. Counter 28 outputs the signal to processor 32 which determines from the counter signal various parameters of gear or shaft 12 such as speed, acceleration and/or position.

System 30 may utilize laser diodes or LED's that are often preferred as optical sources for fiber optic communication links. Complementary metal-oxide semiconductor (CMOS) digital electronics 50 requires 2 to 6 volts. Pickoff coil 38 has a sufficient number, i.e., 100-500, of turns to generate the sufficient voltage (2-6 volts) for even low rates such as 5 pulses per second. The energy imported to the coil on each pass of the magnet or cog is taken from the kinetic energy of the rotating element. This energy $W_H$ is given by the formula:

$$W_H \approx g \cdot S \cdot B^2/\mu$$

where
g = gap
S = pole piece cross-sectional area
B = magnetic flux density due to the magnet
$\mu$ = permeability of free space.

For typical dimensions and magnets, this energy $W_H$ attains a maximum of about 1 $\mu J$ (microjoule) and a significant fraction of this energy is efficiently captured by circuit 30. The physical parameters are adjusted to ensure that the energy required by circuit 30 for optical data transmission, typically 10-100 nanojoules, is less than the energy input. The number N of turns of winding required for an optimum coil 38 impedance match is given approximately by the following equation:

$$N = Vt/2B_{max}$$

where
V = expected circuit voltage ($\approx 3$ volts)
t = time of magnet passage across pole piece
$B_{max}$ = maximum magnetic flux density due to the magnet. LED 20 is excited with a 300 nanosecond pulse of about 10 milliamps. This pulse is sufficient to produce an adequate light signal through optic fiber 22 to photo diode 24. The energy required per pulse to LED 20 is about 6 nanojoules per pulse (Energy = 300 nanoseconds $\times$ 10 milliamps $\times$ 2 volts). The current pulses from coil 38 are sent alternately through the base-emitter junctions of transistors 40 and 42, and are stored on capacitors 44 and 46, respectively. Capacitors 44 and 46 have opposite polarities, thus capacitor 48 has double the voltage of each capacitor 44 or 46. This allows capacitor 48 to store enough energy to power the timer of integrated circuit 50. Integrated circuit 50 may be replaced by a circuit having discrete elements including transistors. FIG. 6 is the schematic of integrated circuit 50. A very fast clock trigger (i.e., at the leading edge) is required to efficiently and effectively trigger timer 50. Such trigger may be a 300 nanosecond pulse. The collectors of transistors 40 and 42 form part of the clock circuit and output a trigger signal to terminal A of integrated circuit 50. As each transistor, 40 and 42, is alternately turned on according to the sign of the changing flux and magnetic circuit of components 36 and 38 (EMF = $-d\phi/dt$), the collector emitter voltage $V_{ce}$ slams toward the saturation voltage (i.e., $+/-0.2$ volts), and then the magnetically induced current and the collector-emitter capacitances determine the step response of the clock output signal at the tied-together collectors of transistors 40 and 42. The step response of the clock output may be shortened by using more turns in coil 38 and/or using a faster transistor pair such as 2N5771 and 2N2369, respectively, in place of transistors 2N2907 and 2N2222 as transistors 40 and 42.

Figure 3:
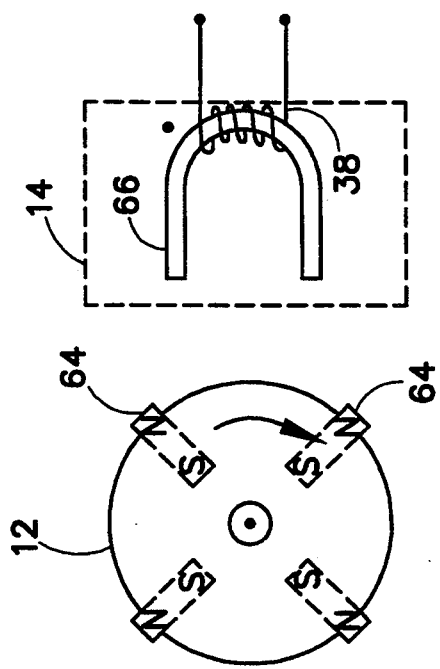
FIG. 3 shows another kind of pickup device different from that shown in FIG. 2.

Sensor 14 utilizes a magnetic pole piece 36 along with coil 38. The magnetic circuit of pole piece 36 is closed with ferrous gear or wheel 12 having teeth or cogs 34 coming close to the north and south poles of magnetic piece 36 thereby closing the magnetic circuit periodically. The gap dimensions may vary from 1 to 10 mils. Cogs 34 may be strips 58 etched or cast onto a wheel or gear face 62 of wheel or gear 60 as shown in FIG. 5b. FIG. 3 shows sensor 14 having a pole piece 66 which is not like a magnetic pole piece 36 of FIG. 2. Magnetic circuits are created by cog 64 of wheel or gear or axle 12. In fact, gear or wheel or axle 12 may have only one cog 64 which is magnetic or a magnet. If cog or magnet 64 passes very closely by the ends of horse shoe pole piece 66 wound with coil 38, the voltage induced in the coil is proportional to the time rate of change of magnetic flux due to magnet 64. Pole piece 66 is a ferrous metal. The voltage at the terminals of coil 38 may be represented by equation EMF = $-d\phi/dt$.

Wheel, gear or axle 12 may have cogs situated in a particular fashion so as to reveal a code according to position, to sensor 14 which ultimately is decoded by processor 32 of receiver 26. For example, axle or wheel 12 may have cogs or bars 68, 70, 72 and 74 as in FIG. 7, which in combination close the magnetic circuits of pole pieces 36 in various combinations according to the position of wheel or axle 12. For instance, a three bit wide grey-type magnetic code can be used for indicating the position of wheel or axle 12. Grey code is useful because it has error-checking properties for one-bit changes. Grey binary code has the following three-bit words for various decimal digits representing positions: 000=0; 001=1; 011=2; 010=3; 110=4; 111=5; 101=6; and 100=7. Four-bit words can discriminate 16 positions, five-bit words 32 positions, and so on. FIG. 4 shows an example of a surface 13 having 3-bit words for position indication, that encircles an axle 12. Bar or cog 68 is the reference bar; bar 70 is the most significant bit bar; bar or cog 74 is the least significant bar; and the intermediate bar is bar 72.

FIG. 5a illustrates axle wheel 12 with bars 68, 70, 72 and 74 which close the magnetic circuits of pole magnet 36 upon which voltages are induced in coils 38. These bars may be etched or cast into the face of gear or wheel 60 of FIG. 5b. Such codes or bars close the magnetic circuits of pole magnets 36 thereby inducing signals in windings 38. The grey code plate pickup mechanism is able to provide instantaneous position, acceleration and speed of gear or wheel 12 or 60. Bars 68, 70, 72 and 74 on axle, gear or wheel 12 of FIGS. 5a and 5b, may be magnets and function like sensor 14 in FIG. 3. If so, then pole pieces 36 would not need to be magnets.

Figure 7:
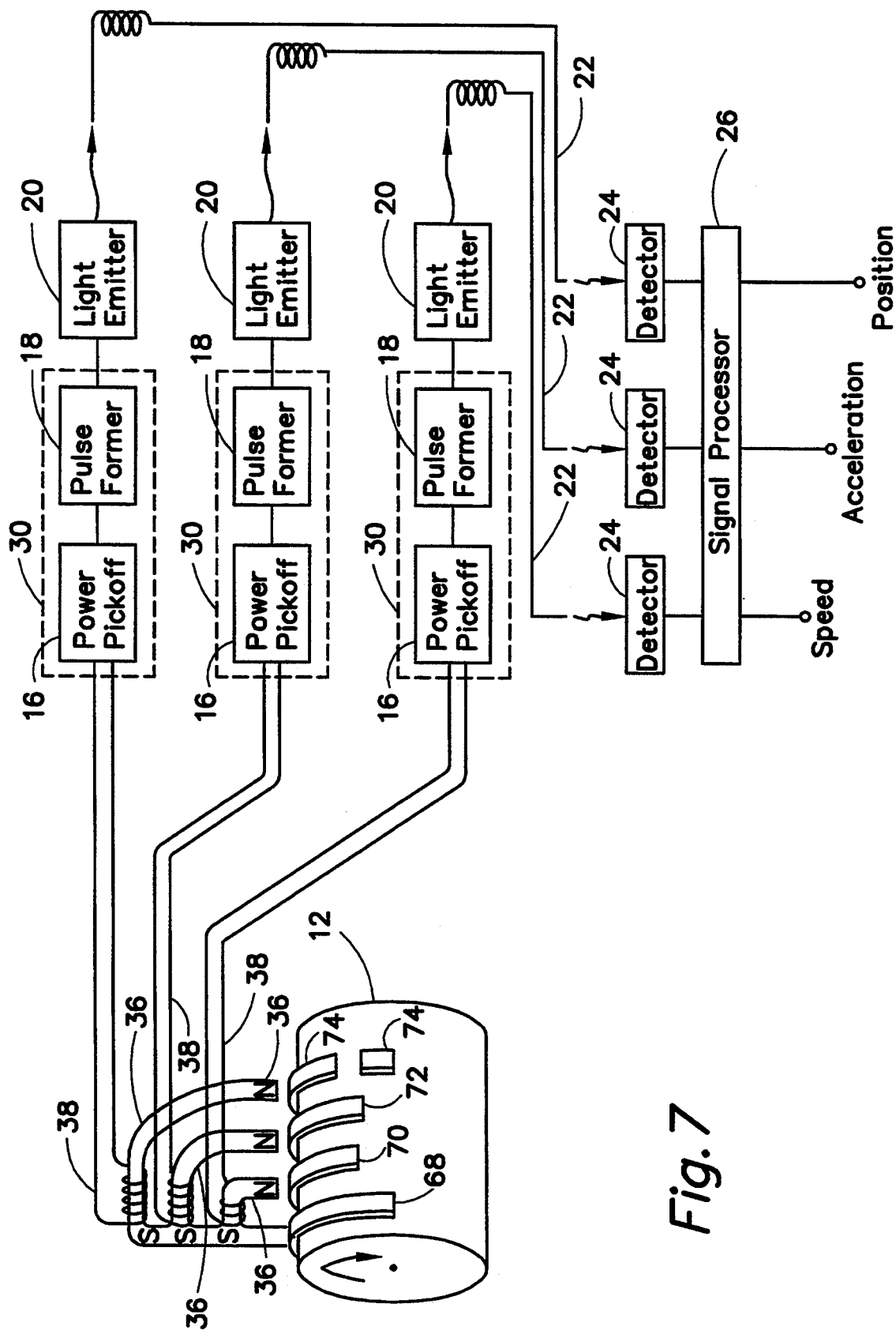
FIG. 7 illustrates a position indicator having a tripled version of the self-powered sensor.

The sensor configurations of FIGS. 5a and 5b have three windings 38 which may be connected to three separate circuits 30 as illustrated in FIG. 7. Three signals or channels of light are fed to three photo detectors and three signals of photo detectors 24 are fed through counter 28 which in turn outputs signals to processor 32 for determination of position, acceleration and speed of wheel or gear or axle 12.

Various combinations of the invention may be implemented so as to appropriately fit the application at hand.

I claim:

1. A self-powered variable reluctance sensor system comprising:
   a coil of wire, having first and second terminals, wherein the coil is proximate to a rotatable material a rotation of the rotatable material causing a magnetic flux to cut through the coil and generate in the coil voltage signals at the first and second terminals;
   a first transistor having a first terminal connected to the first terminal of said coil, and having second and third terminals;
   a second transistor having a first terminal connected to the first terminal of said coil, having a second terminal connected to the second terminal of said first transistor, and having a third terminal;
   a first capacitor having a first terminal connected to the third terminal of said first transistor and having a second terminal connected to the second terminal of said coil;
   a second capacitor having a first terminal connected to the third terminal of said second transistor and having a second terminal connected to the second terminal of said coil;
   a third capacitor having a first terminal connected to the third terminal of said first transistor and having a second terminal connected to the third terminal of said second transistor;
   a retriggerable monostable multivibrator having a first input connected to the second terminal of said first transistor, having a second input terminal, a clear terminal and a voltage terminal connected to the third terminal of said first transistor, having a reference terminal connected to the third terminal of said second transistor, having an external resistor terminal, having an external capacitor terminal and having an output terminal;
   a first resistor having a first terminal connected to the external resistor terminal of said multivibrator and having a second terminal connected to the voltage terminal of said multivibrator; and
   a fourth capacitor having a first terminal connected to the external capacitor terminal of said multivibrator and having a second terminal connected to the external resistor terminal of said multivibrator.

2. The self-powered sensor system of claim 1 further comprising a light emitting device having a first terminal connected to the output terminal of said multivibrator and having a second terminal connected to the reference terminal of said multivibrator.

3. The self-powered sensor of claim 2 further comprising:
   a light waveguide connected to said light emitting device; and
   a light detecting device connected to said light waveguide.

4. The self-powered sensor of claim 3 further comprising:
   a counter connected to said light detecting device; and processing means, connected to said counter, for determining rotational parameters of the rotatable material.

5. The self-powered sensor of claim 4 wherein the voltage signals at the first and second terminals contain positional information about the rotatable material.

* * * * *